United States Patent [19]

Jones et al.

[11] 4,224,818
[45] Sep. 30, 1980

[54] METHOD AND APPARATUS FOR COLD FINISHING OF METALS

[75] Inventors: Samuel H. Jones, Flossmoor; Dick A. Stawarz, Momence, both of Ill.

[73] Assignee: LaSalle Steel Company, Chicago, Ill.

[21] Appl. No.: 938,862

[22] Filed: Sep. 1, 1978

[51] Int. Cl.³ .............. B21C 1/26; B21C 3/14; B23B 5/00
[52] U.S. Cl. ........................ 72/284; 72/285; 72/289; 72/428; 82/20
[58] Field of Search ............. 72/40, 275, 284, 285, 72/340, 419, 428, 289; 29/DIG. 11; 90/24 R, 24 A, 24 B, 24 D, 28; 82/20; 407/1

[56] References Cited

U.S. PATENT DOCUMENTS

| 2,225,399 | 12/1940 | Kraus | 90/28 |
|---|---|---|---|
| 2,250,886 | 7/1941 | Blodgett | 72/289 |
| 2,655,066 | 10/1953 | Siegerist | 82/20 |
| 3,038,361 | 6/1962 | Hölzer | 82/20 |
| 3,213,663 | 10/1965 | Coan | 72/285 |
| 3,350,965 | 11/1967 | Brauer et al. | 82/20 |
| 3,430,477 | 3/1969 | Breyer | 72/275 |
| 3,486,403 | 12/1969 | Schweer et al. | 82/34 R |

Primary Examiner—Milton S. Mehr

[57] ABSTRACT

An apparatus and method of cold finishing of metals wherein a metal workpiece having a repeating cross section is advanced between a plurality of pairs of rollers and is driven through a die or cutting tool. The apparatus includes entry vee guides, a gimbaled die or cutting toolholder, special dies, and a special exit guide. The method results in bars having the usual cold finished qualities of accurate size, smooth surface finish, and uniform shape with the added quality of uniform residual stresses.

16 Claims, 10 Drawing Figures

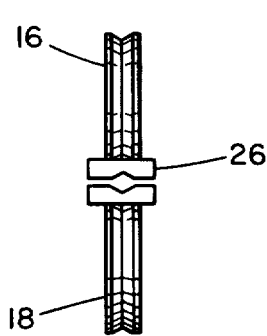
FIG.5
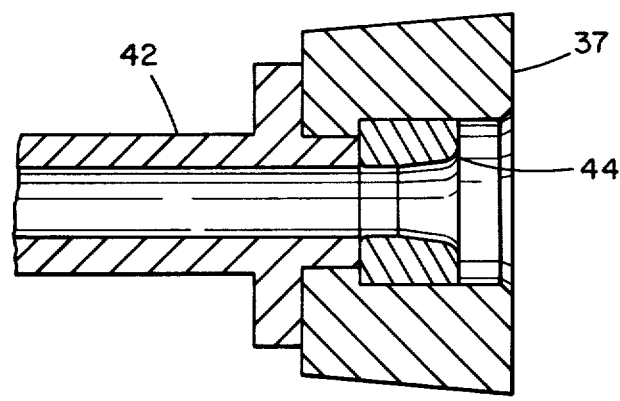
FIG.8
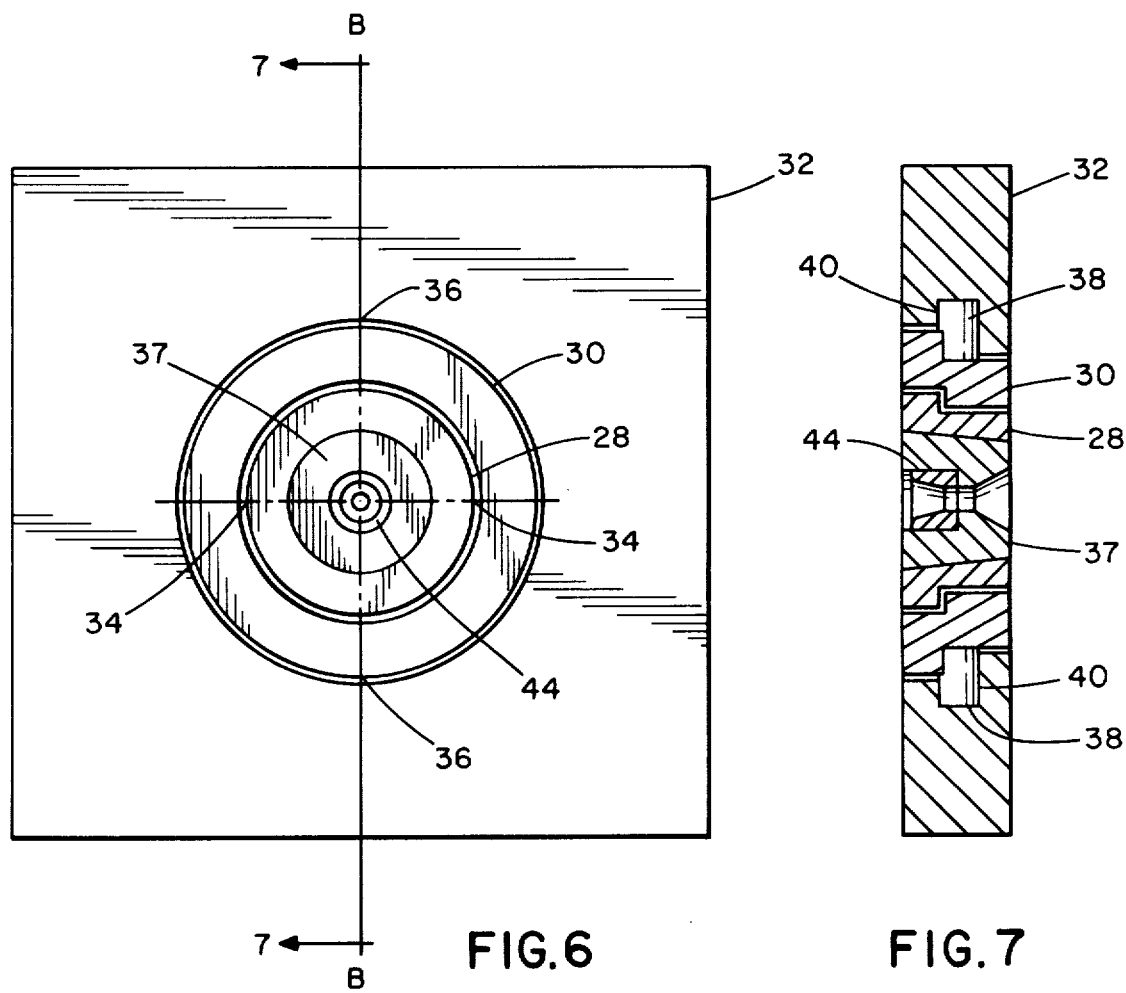
FIG.6
FIG.7

METHOD AND APPARATUS FOR COLD FINISHING OF METALS

This invention relates to the cold finishing of metals, and more particularly to a new and improved method and apparatus for the cold finishing of metal workpieces having a repeating cross section.

It is well known that cold finishing results in a significant modification of the mechanical properties and a significant improvement in size accuracy, surface finish, and shape of most metals, including steel. At the present time, it has been the practice, in the cold finishing of elongate rod or bar workpieces or like materials having repeating sections, the workpiece is generally pulled through a cold finishing tool such as a draw die, one or more shaving tools or the like, on a drawbench.

Notwithstanding the side commercial acceptance of such procedures, they are significantly less than efficient in terms of scrap produced, productivity, quality, and production costs. For example, each workpiece is generally provided with an end portion formed of several inches which is positioned in the cold finishing tool and then gripped by the drawbench carriage to pull the rest of the workpiece through the finishing tool. Where use is made of a reduction die imposing a heavy draft or a shaving tool, that portion must be prepared in advance of the cold finishing operation, using a point swagging or turning machine. The necessity of carrying out that pointing operation for each workpiece to be processed adds significantly to the manipulative steps in the cold finishing operation and, hence, to the cost.

In those operations utilizing a light draw-die draft, the additional operating costs can be avoided by pointing on the drawbench with a push-point attachment. However, that procedure does not solve the problem; while it eliminates the need for a separate pointing operation, the on-the-bench pointing itself is often subject to severe shortcomings. For example, it is common for the point to buckle, for the push-grip to leave marks on the cold finished product and/or for the productivity of the drawing operation to be impaired.

In all events, the practice employed in the prior art requires that a pointing operation be carried out, either on or off the bench, thereby necessitating that the point be discarded in a separate shearing or sawing operation. And that adversely affects the number of operating steps and the amount of scrap produced.

Another major disadvantage in terms of efficiency of the use of conventional drawbenches in the cold finishing of steel and like workpieces arises from the fact that the drawbench operation is a "reciprocating" operation. Thus, after the point is advanced through the die and operatively connected to the carriage of the drawbench, the carriage is advanced to draw the workpiece through the tool, the carriage must be returned to pick up another workpiece for advancement through the tool. Consequently, the interval between the time the bench carriage finishes pulling one workpiece through the tool and the time in which the carriage is ready to advance another workpiece through the tool is a non-productive, non-pulling interval. In other words, no useful work can be carried out in which the bench carriage is returned to pick up another workpiece for advancement through the tool. In addition to those disadvantages, the carriage is of necessity a heavy piece of equipment which must be accelerated and decelerated in a reciprocating operation. Because of the acceleration and deceleration attendant in their use, drawbenches are generally operated at fairly slow speeds, thereby further reducing productivity.

Another major disadvantage of a conventional drawbench operation is that undesirable residual stress patterns remain in the workpiece after being drawn through a die. Prior to drawing, hot rolled bars are not perfectly round or straight. Also, the drawing operation is less than perfect with some misalignment between die and carriage expected. In addition, the bar is allowed to sag due to its own weight because the bar is unsupported as it leaves the die. Since all of these items adversely affect the straightness of the cold finished bar, a straightening operation is needed after drawing. This straightening operation results in bars with minimum curvature, but the bars have a non-uniform distribution of residual stresses. These stresses adversely affect the bar during subsequent machining operations resulting in warpage and distortion.

Residual stresses can be reduced in a drawbench operation, but it requires a skilled operator and results in some bars in each run still having an undesirable pattern of residual stress. After much experience, some drawbench operators can achieve good bar straightness. However, this requires much adjustment while drawing the first few bars. These bars will therefore need much straightening resulting in a non-uniform pattern of residual stress.

It is accordingly an object of this invention to provide a new and improved method and apparatus for the cold finishing of metals which overcomes the foregoing disadvantages.

It is a more specific object of the invention to provide an improved method and apparatus for the cold finishing of metals which yields bars having a uniform pattern of residual stress. It is known that during a cold forming process, the yield strength of the workpiece will be reached and plastic flow occurs as the workpiece advances through the die. It has been demonstrated that under the conditions of plastic flow, the bar can be directed with little force as it emerges from the die. The vee and exit guides, provided for directing the bar as it enters and leaves the die, results in a cold finished bar requiring little or no straightening. These bars can then be made commercially straight with minimum effort with conventional equipment. Because there is little curvature after cold finishing and before straightening, a uniform pattern of residual stress will result. The uniform residual stress pattern minimizes the problem of warpage or distortion during subsequent machining operations.

It is a more specific object of the invention to provide an improved method and apparatus for cold finishing of metals which can be operated in a continuous or substantially continuous manner and which minimizes the amount of scrap produced. When the cold finishing tool is a die, this method also eliminates non-uniform residual stresses in the bar.

These and other objects and advantages of the invention will appear more fully hereinafter and, for purposes of illustration but not of limitation, an embodiment of the invention is shown in the accompanying drawings wherein:

FIG. 5 is a sectional view taken along the lines A—A of FIG. 4;

FIG. 6 is an entry face view in elevation of the gimbal used in the practice of this invention;

FIG. 7 is a sectional view taken along the lines B—B of FIG. 6;

FIG. 8 is a detailed view of a draw die with its associated exit guide;

Figure 1:
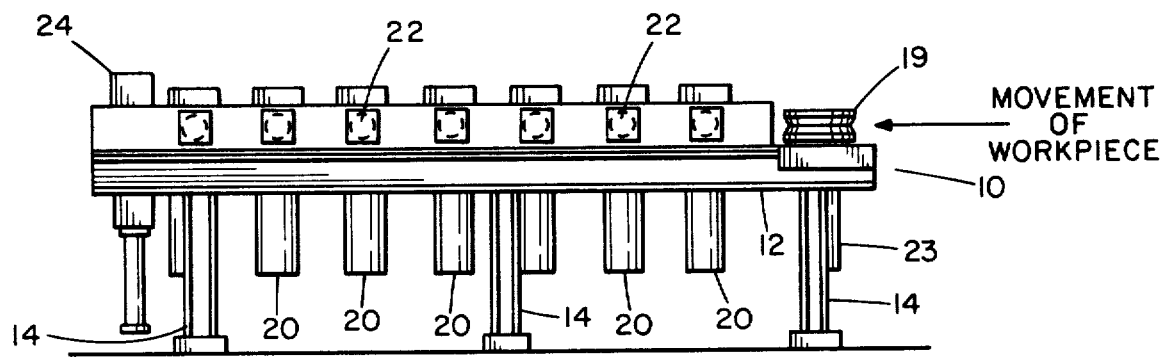
FIG. 1 is a side view in elevation of apparatus embodying the concepts of this invention.

The concepts of this invention reside in a method and apparatus for use in the cold finishing of metals wherein a metal workpiece of repeating cross section is engaged between a plurality of pairs of rollers which grip the workpiece in pressure engagement. The rollers are driven to thereby advance the workpiece in a forward direction through a series of vee guides and through a cold finishing tool, such as a draw die or a cutting tool. The finishing tool is mounted in a gimbaled fashion to thereby assure that the workpiece is continuously and automatically aligned with the cutting tool, or that the position of the die is locked to assure maximum straightness thereby improving the quality of the finished workpiece. The quality of the workpiece is further improved by the use of the exit guide after the finishing tool.

Thus, in the practice of this invention, in the push drawing or push broaching of metal workpieces, it is unnecessary to employ the prior art practice of pointing each workpiece advanced through the finishing tool. Instead, long workpieces can be advanced through the pairs of rollers and, hence, through the finishing tool without the need to employ a pull-grip on one end of the workpiece. In addition, the method and apparatus of this invention obviates the need to reciprocate a carriage to advance the workpiece through the finishing tool and then return it to the starting position to pick up another workpiece. On the contrary, the method and apparatus of this invention does not rely upon any reciprocating carriage, and thus facilitates more efficient productivity.

Referring now to the drawing for a more detailed description of the invention, there is shown in FIGS. 1 to 4 a push bench 10 embodying the features of this invention. The push bench 10 includes a horizontal frame member 12 which is supported by a plurality of legs 14 carrying the frame 12. Mounted on the frame 12 are a plurality of drive rollers 16 and 18 adapted to engage the workpiece of repeating cross section therebetween. In the preferred practice of this invention, both of the drive rollers of each pair are driven by suitable motor means, preferably hydraulic motors illustrated as 20.

Figure 2:
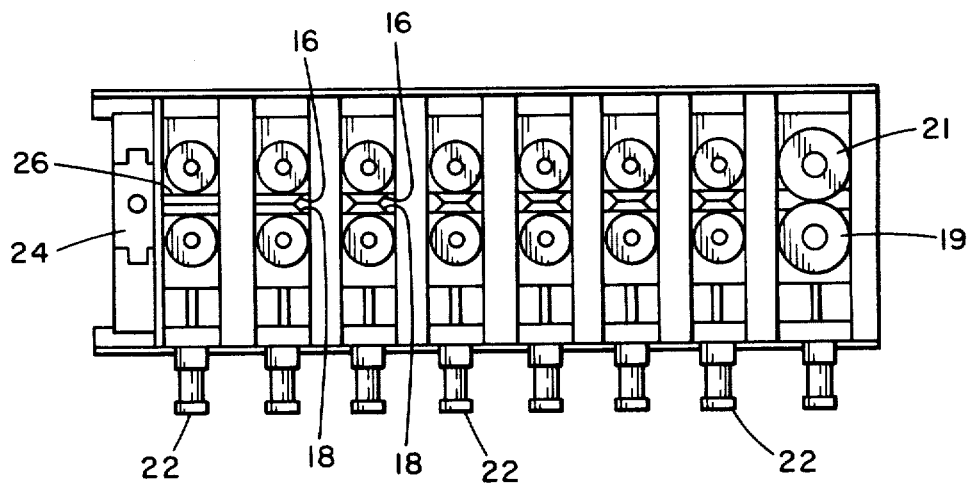
FIG. 2 is a top view of the apparatus shown in FIG. 1.
Figures 3, 4:
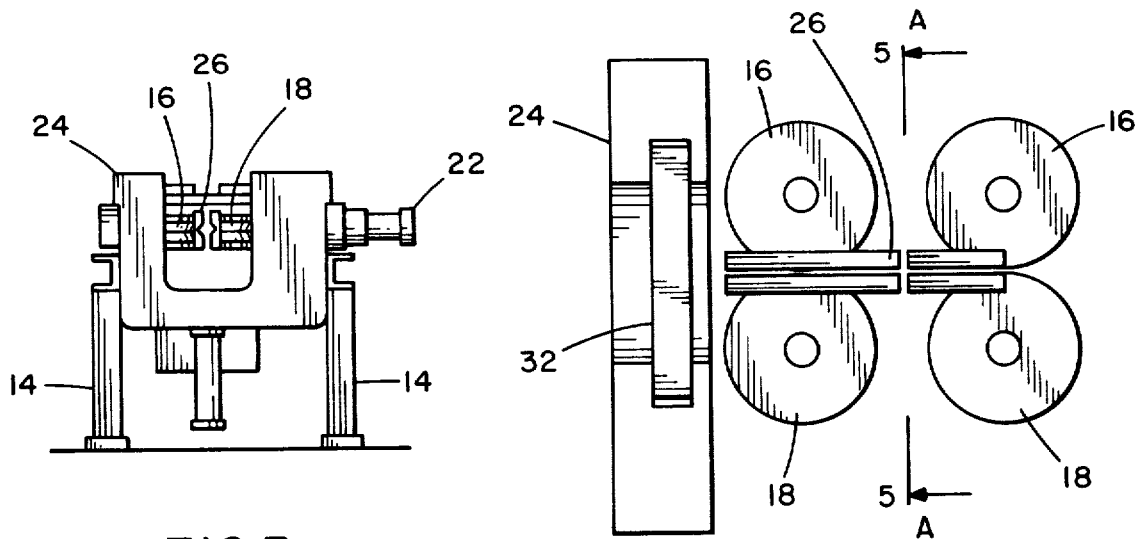
FIG. 3 is an exit end view of the apparatus shown in FIG. 1.
FIG. 4 is a detailed view of the apparatus shown in FIG. 2.

In the preferred embodiment of the push bench as illustrated in FIGS. 1 to 3, the roller 16 of each pair is driven by means of the hydraulic motor 20 and is fixed in position. The other roller of the pair 18 is operatively connected to a hydraulic cylinder 22 which serves to constantly urge the roller 18 toward the fixed roller 16 and thereby engage the metal workpiece between the two rollers. As will be appreciated by those skilled in the art, such push benches are generally known to those skilled in the art and are described in U.S. Pat. Nos. 2,187,485; 2,829,565; 3,350,965; 3,486,403; 3,528,327; and, 3,750,497.

Mounted on one end of the push bench 10 is the die block 24 containing the finishing tool. As described above, the finishing tool can be any of a variety of known cold finishing tools including draw dies and cutting tools. Such finishing tools are described in U.S. Pat. Nos. 3,055,102; 3,157,093; 3,157,274; 3,168,004; 3,430,477; 3,760,488; and 3,918,288.

FIGS. 4 and 5 illustrate the details of the push bench 10 as described above. As can be seen in these Figures, a workpiece is positioned between the rollers and is gripped therebetween; as the rollers are rotated by means of the hydraulic motors 20, the metal workpiece is advanced in a forward direction. In the preferred practice of this invention, and to facilitate the use of this invention in the processing of small diameter workpieces, it has been found essential to provide the equipment with means to support the workpiece as it is advanced through the push bench 10. For this purpose, the push bench is provided with vee guides 26. As is best shown in FIG. 5 of the drawing, the vee guides are formed of a pair of blocks having a triangular groove extending through in opposing faces. Thus, the space defined by the opposing triangular grooves is adapted to receive small diameter workpieces to support them and thereby prevent buckling of the workpiece as it is advanced into the finishing tool.

Figure 9:
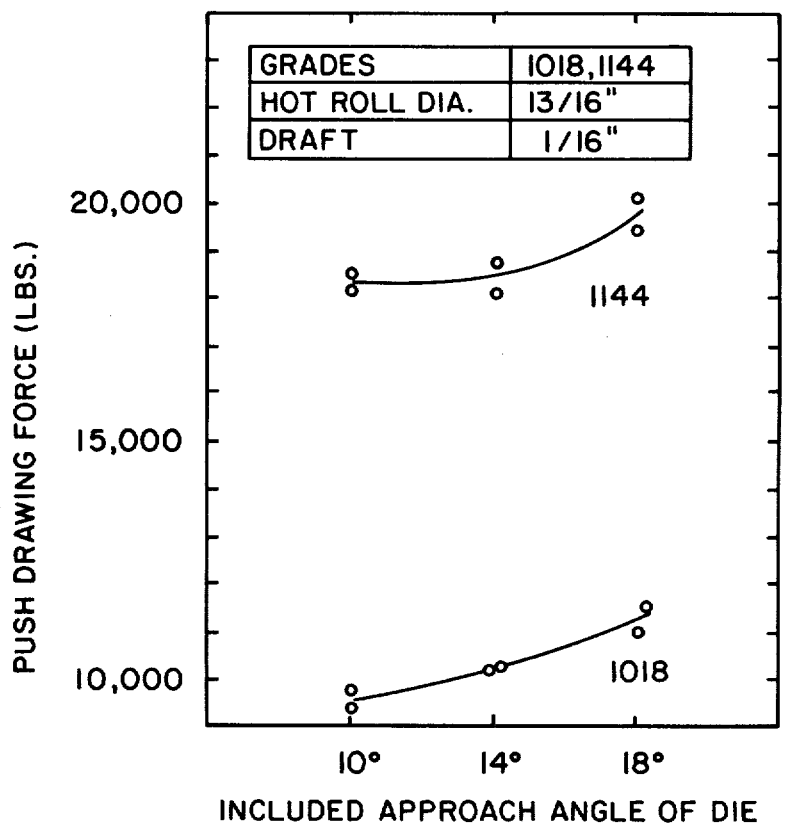
FIG. 9 shows the effect of die approach angle on push drawing forces.

The finishing tool, in the form of a draw die, is shown in detail in FIGS. 6 and 7 of the drawing. To reduce the force needed to drive a bar through the draw die 37 and also to reduce the tendency of the bar to buckle before the die, special die geometries are needed. As shown in FIG. 9, the minimum preferred included approach angle is 10°. With smaller angles, the forces tend to increase and also the length of the standard die nib 44 limits the length of the bearing area. The maximum preferred included approach angle is shown to be 18° in FIG. 9. With larger angles, the push force becomes excessive and undesirable stress patterns are produced which could result in bar cracking. The finishing tool can be either a draw die as illustrated, or it can be a cutting tool of the type described in the foregoing patents.

It is an important concept of the invention that the finishing tool be gimbaled so that it is capable of movement in any direction. To this end, the gimbal includes an inner ring 28 for containing either a draw die or a cutting tool. Surrounding the inner ring 28 is an intermediate ring 30 which in turn is mounted in a face plate 32. The latter in turn is fixed on the push bench by the die block 24 as shown in FIG. 1.

The gimbaled mounting of the finishing tool 37 must be accomplished in the manner detailed because it is a critical aspect of the invention. In the embodiment shown in FIGS. 6 and 7, the inner ring 28 is pivotally mounted on the intermediate ring 30 at points 34 illustrated in FIG. 6 of the drawing. The intermediate ring 30 is likewise pivotally mounted to the face plate 32 at points 36 as shown in FIG. 6. The pivotal mounting can be accomplished simply by use of a cylindrical projection 38 fixed to the intermediate ring 30 and rotatable within a cavity 40 of the face plate 32. Thus, the pivot pins 38 permit the intermediate ring 30 to be pivoted to and from the plane of the drawing of FIG. 6 about the pivot points 36. In a like manner, the inner ring 28 is pivotable about the pivot points 34, thus providing a gimbaled mounting for the finishing tool 37.

The gimbaled mounting of a cutting tool insures continuous and automatic centering of the cutting tool with the workpiece being advanced therethrough. The workpiece is ideally centered in the cutter so that the surface is removed in an even manner. Thus, the gimbaled finishing tool 37 in the form of a cutter is free-floating and automatically compensates for deviations in the alignment of the workpiece being advanced therethrough by the pairs of rollers of the push bench 10.

Where the finishing tool is a draw die, the die is positioned, where desired, to assure maximum straightness by locking the finishing tool 37 in the desired position. If it is not locked in position, the draw die can be free-floating, although this can affect, to some degree, the straightness of the workpiece advanced therethrough.

To that end, it is essential to provide the finishing tool 37 with an exit guide to control workpiece straightness as it emerges from the working tool. This variation of the invention is particularly desirable where the finishing tool 37 is a draw die. As shown in FIG. 8 of the drawing, the draw die 37 is simply provided with a pipe guide 42 communicating with the nib 44 of the die. Thus, the workpiece is advanced through the die nib 44 and into the pipe guide 42 to substantially prevent or minimize curvature of the workpiece emerging from the finishing tool 37.

The straightness depends on the inner diameter of the guide and the distance between the pipe guide and the die nib. In general, the narrower the tolerance between the diameter of the pipe guide 42 and the workpiece advanced through the finishing tool 37, the greater is the straightness of the workpiece emerging from the equipment. Also, the straightness is improved by minimizing the distance between the pipe guide 42 and the die nib 44.

Thus, in the practice of this invention, a workpiece is positioned in the push bench 10 and is gripped by the pairs of rollers 16 and 18 and thereby further advanced through the finishing tool 37. Because it is unnecessary to point the workpieces before they are introduced into the equipment, the method of this invention provides a marked reduction in scrap losses which would otherwise be formed by reason of the pull grip where a reciprocating carriage is used to advance the workpiece through the finishing tool. In addition, no return stroke is necessary as it is in the case of a carriage, and thus the method of this invention facilitates continuous operation.

Figure 10:
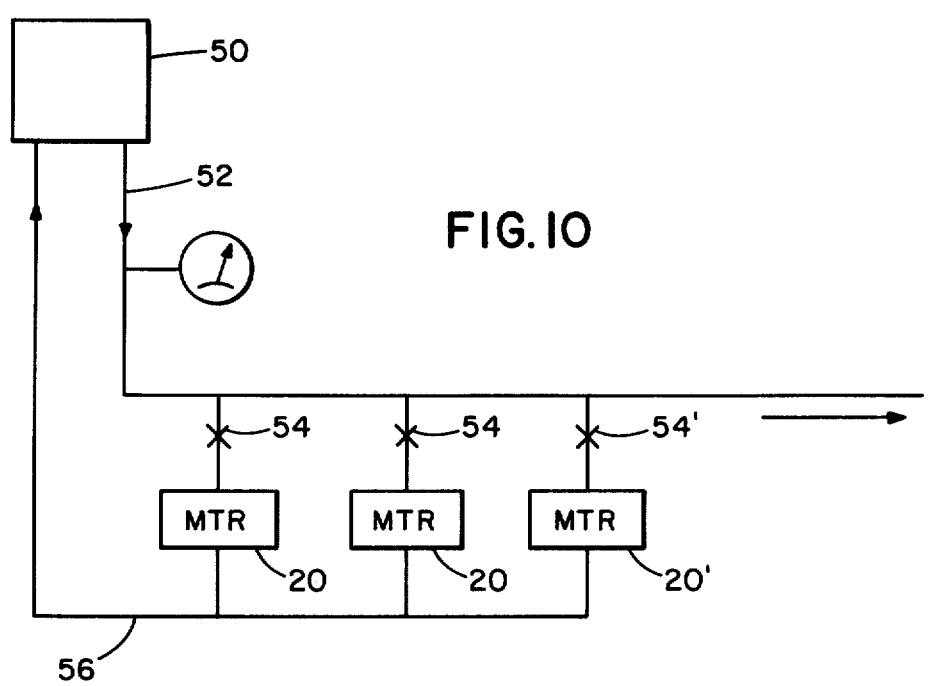
FIG. 10 is a schematic drawing of a hydraulic system for operating the apparatus of the invention.

It is also an important concept of the invention that the hydraulic motors be driven in parallel with a flow limiting valve positioned ahead of each hydraulic motor to limit the flow of the hydraulic fluid through the motor. Illustrating this concept of the invention is FIG. 10 of the drawing, schematically illustrating a hydraulic system. Included is a positive displacement pump 50 for pumping hydraulic fluid at a relatively high pressure which is operatively connected to the plurality of hydraulic motors 20 and 20' as shown in FIG. 10. The hydraulic line to the motor 52 includes a flow limiting valve 54 and 54', serving to restrict the volumetric flow of hydraulic fluid to the motors 20 and 20'. As those skilled in the art appreciate, the hydraulic system also includes a hydraulic return line 56 which serves to direct the flow of hydraulic fluid exiting from the motors 20 and 20' back to the pump 50 for reuse. As is also shown in FIG. 10, each of the hydraulic motors 20 and 20' is connected in parallel with the pump 50.

The improvement afforded by way of this hydraulic system can be illustrated by the following: If the rollers driven by the hydraulic motor 20' slips, the pressure within that hydraulic motor drops initially. That condition would normally lead to a significant increase in volumetric flow of hydraulic fluid to the motor. That, in turn, cannot happen in the hydraulic system used in the practice of this invention because of the presence of the flow limiting valves 54 in each hydraulic line leading to the hydraulic motors. Because a significant additional volumetric flow of hydraulic fluid to hydraulic motor 20' cannot occur by reason of its associated flow limiting valve 54, the pressure drop in the system is minimized. With the flow limiting valve 54, the pressure in the system can increase in order to develop more torque in the hydraulic motors which are not slipping and therefore prevent stalling of the workpiece.

That represents an important concept of the invention by reason of the fact that the static coefficient of friction is greater than the dynamic coefficient of friction, thus necessitating that slippage of the drive roller driven by the hydraulic motors be minimized. By reason of the fact that slippage of one motor results in the development of increased torque by the other motors, slippage of the drive roller is minimized. That in turn serves the purpose of accommodating variations in the speed of bars advanced through the bench as well as accommodating variations in the diameters and cross sectional areas of the workpieces being processed.

It is also preferred, in the practice of this invention, to provide a separate or auxiliary hydraulic source for the entry pair of drive rollers 19 and 21 as shown in FIGS. 1 and 2. The hydraulic motor 23 which drives those entry drive rollers 19 and 21 is thus an auxiliary system, operating independently of the system shown in FIG. 10 to operate hydraulic motors 20 and their associated drive rollers 16 and 18, respectively. At the same time, drive rollers 19 and 21 are driven at a higher rate than the drive rollers 16 and 18, respectively, to insure end-to-end contact between the end of one bar and the leading end of the next successive bar. That feature simplifies the manual feeding of bars and, more importantly, facilitates maximum productivity since there is no gap between the end of one bar and the leading end of the next successive bar. With no gap, roller 18 cannot be urged between bars where it would block the path of the next successive bar.

The hydraulic cylinders 22 used to constantly urge one roller 18 toward the fixed rollers 16 to engage the metal workpiece therebetween are also supplied with hydraulic fluid from a suitable source, not illustrated in the drawing. In general, it is preferred that these hydraulic cylinders be connected to the source of hydraulic fluid under pressure in a parallel relation, although it is not necessary to employ flow limiting valves in the hydraulic line.

It will be understood that various changes and modifications can be made in the details of construction, procedure and use without departing from the spirit of the invention, especially as defined in the following claims.

We claim:

1. Apparatus for the cold finishing of metals comprising at least one pair of rollers adapted to engage a workpiece of repeating cross-section therebetween, with one of the rollers of said pair being movably mounted and hydraulic means to continuously urge said one roller toward pressure engagement with the other roller of the pair to secure the workpiece therebetween, means for driving at least one of said rollers to advance the workpiece in a forward direction, V-shaped guides to support the workpiece and a cold finishing tool mounted down stream of said pair of rollers adapted to receive the workpiece advanced thereby, said finishing tool being mounted in a gimbaled fashion.

2. Apparatus as defined in claim 1 wherein the cold finishing tool is a draw die.

3. Apparatus as defined in claim 1 wherein the cold finishing tool is a cutting tool.

4. Apparatus as defined in claim 1 which includes a plurality of pairs of rollers mounted in line to advance the workpiece through the cold finishing tool.

5. Apparatus as defined in claim 1 which includes motor means to drive at least one of said rollers to advance the workpiece in a forward direction and through the cold finishing tool.

6. Apparatus as defined in claim 5 wherein the motor means includes a hydraulic motor.

7. Apparatus for the cold finishing of metals comprising a plurality of pairs of rollers, each pair adapted to grip a workpiece of repeating cross-section therebetween, hydraulic means for driving at least one roller of each pair to advance the workpiece in a forward direction, said hydraulic means including (a) a plurality of hydraulic motor means operatively connected to at least one roller of each pair of rollers to drive that roller, (b) means to supply hydraulic fluid under pressure to each of the hydraulic motor means and (c) flow limiting means to restrict the flow of hydraulic fluid to each of the hydraulic motor means, and a cold finishing tool mounted down stream of the plurality of pairs of rollers adapted to receive the workpiece whereby the source of hydraulic fluid drives the plurality of pairs of rollers to advance the workpiece through the finishing tool such that slippage of one pair of rollers in respect to the workpiece results in a pressure drop across the hydraulic motor means driving that pair of rollers and the flow limiting valve prevents increased flow of hydraulic fluid to the hydraulic motor means to thereby permit an increase in the pressure supplied to the remaining hydraulic motor means and increase the torque thereof.

8. Apparatus as defined in claim 7 wherein the cold finishing tool is a draw die.

9. Apparatus as defined in claim 7 wherein the cold finishing tool is a cutting tool.

10. Apparatus as defined in claim 7 which includes vee guides to support the workpiece advanced through the cold finishing tool.

11. Apparatus as defined in claim 7 which includes an entry pair of rollers positioned in advance of the plurality of pairs of rollers, at least one of the pair of entry rollers including means to drive the roller at a speed greater than the speed at which the plurality of rollers are driven.

12. A method for the cold finishing of metals comprising positioning a metal workpiece of repeating cross section between a plurality of pairs of rollers, each pair adapted to grip the workpiece therebetween and having hydraulic motor means to drive at least one roller of each pair of rollers, supplying hydraulic fluid through a parallel circuit to each of the hydraulic motor means to drive at least one roller of each pair and advance the workpiece in a forward direction while limiting the flow of hydraulic fluid through each of the hydraulic motor means whereby slippage of one pair of rollers results in a pressure drop across the hydraulic motor means driving that pair of rollers and the flow limiting valve prevents the increased flow of hydraulic fluid to that hydraulic motor means to thereby permit an increase in the pressure supplied to the remaining hydraulic motor means and increase the torque thereof, and providing a cold finishing tool down stream of the plurality of pairs of rollers whereby the driving of the rollers by the hydraulic motor means advances the workpiece through the cold finishing tool to cold finish the workpiece.

13. A method as defined in claim 12 which includes the step of supporting the workpiece as it is advanced between the rollers.

14. A method as defined in claim 12 wherein the cold finishing tool is a draw die.

15. A method as defined in claim 12 where the cold finishing tool is a cutting tool.

16. A method as defined in claim 12 which includes the step of driving the first of the pairs of rollers at a speed greater than the speed of the remaining pairs of rollers.

* * * * *